(12) United States Patent
Li et al.

(10) Patent No.: US 8,995,811 B2
(45) Date of Patent: Mar. 31, 2015

(54) INSULATION PRESSURE-RESISTANCE CYLINDER BODY OF SUBMARINE CABLE EQUIPMENT, SUBMARINE CABLE EQUIPMENT, AND MANUFACTURING METHOD

(75) Inventors: Qizhong Li, Beijing (CN); Fenglong Chen, Beijing (CN); Ge Jin, Beijing (CN); Xuguang Yang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 502 days.

(21) Appl. No.: 13/542,411

(22) Filed: Jul. 5, 2012

(65) Prior Publication Data

US 2012/0275752 A1 Nov. 1, 2012

Related U.S. Application Data

(63) Continuation of application No. PCT/CN2011/074908, filed on May 30, 2011.

(30) Foreign Application Priority Data

Oct. 21, 2010 (CN) .......................... 2010 1 0526883

(51) Int. Cl.
*G02B 6/00* (2006.01)
*G02B 6/44* (2006.01)

(52) U.S. Cl.
CPC ............ *G02B 6/4428* (2013.01); *G02B 6/4427* (2013.01); *G02B 6/4429* (2013.01)
USPC .......................................................... 385/134

(58) Field of Classification Search
None
See application file for complete search history.

(56) References Cited

U.S. PATENT DOCUMENTS

| 4,029,894 A | 6/1977 | Jarvis et al. |
| 4,172,212 A | 10/1979 | Heinzer |

(Continued)

FOREIGN PATENT DOCUMENTS

| CN | 86105424 A | 3/1988 |
| CN | 1142434 A | 2/1997 |

(Continued)

OTHER PUBLICATIONS

International Search Report issued in corresponding Chinese Patent Application No. PCT/CN2011/074908; mailed Sep. 8, 2011.

(Continued)

*Primary Examiner* — Sung Pak
(74) *Attorney, Agent, or Firm* — Brinks Gilson & Lione

(57) ABSTRACT

An insulation pressure-resistant cylinder body of submarine (undersea) cable equipment, submarine cable equipment, and a manufacturing method are provided. The insulation pressure-resistant cylinder body includes: an installation cylinder, an insulation layer, and a pressure-resistant cylinder, disposed sequentially from inside to outside, where a first groove is opened on an outer surface of the installation cylinder, and a second groove is opened on an inner surface of the pressure-resistant cylinder, the second groove is interlaced with the first groove, and the insulation layer is closely adhered to the outer surface of the installation cylinder and the inner surface of the pressure-resistant cylinder. Through the interlaced grooves on the outer surface of the installation cylinder and on the inner surface of the pressure-resistant cylinder, the insulation layer, the installation cylinder, and the pressure-resistant cylinder are closely and integrally combined, thereby improving stability of the cylinder body.

13 Claims, 6 Drawing Sheets

(56) References Cited

U.S. PATENT DOCUMENTS

| | | | |
|---|---|---|---|
| 5,666,457 A | | 9/1997 | Ogiya et al. |
| 5,799,703 A | | 9/1998 | Kanao et al. |
| 6,131,616 A | * | 10/2000 | Tatsuta et al. ............... 138/121 |
| 7,278,789 B2 | * | 10/2007 | Kordahi ........................ 385/72 |

FOREIGN PATENT DOCUMENTS

| | | |
|---|---|---|
| CN | 2528033 Y | 12/2002 |
| CN | 101241213 A | 8/2008 |
| CN | 101707082 A | 5/2010 |
| JP | 11066978 A | 3/1999 |
| JP | 2008191374 A | 8/2008 |

OTHER PUBLICATIONS

Chinese Patent No. 102147514, issued on Jan. 23, 2013, granted in corresponding Chinese Patent Application No. 201010526883.1.

\* cited by examiner

INSULATION PRESSURE-RESISTANCE CYLINDER BODY OF SUBMARINE CABLE EQUIPMENT, SUBMARINE CABLE EQUIPMENT, AND MANUFACTURING METHOD

CROSS-REFERENCE TO RELATED APPLICATIONS

This patent application is a continuation of International Application No. PCT/CN2011/074908, filed on May 30, 2011, which makes reference to, and claims priority to the Chinese Patent Application No. 201010526883.1, filed on Oct. 21, 2010.

FIELD OF TECHNOLOGY

The present application relates to the field of submarine cable equipment protection technologies, and in particular, to an insulation pressure-resistant cylinder body of submarine (or undersea) cable equipment, submarine cable equipment, and a manufacturing method.

BACKGROUND

The entire submarine (or undersea) line system at least includes Submarine Line Terminal Equipment (submarine line terminal equipment, SLTE for short), Network Protection Equipment (network protection equipment, NPE for short), Power Feeding Equipment (power feeding equipment, PFE for short), a submarine repeater (submarine repeater, RPT for short), a submarine cable (Submarine cable), a submarine line Branching Unit (Branching Unit, BU for short), a submarine line Optical Equalizer (Optical Equalizer, OEQ for short), and a Submarine Line Monitor (Submarine Line Monitor, SLM for short).

The SLTE is a transmission equipment of Dense Wavelength Division Multiplexing (DWDM). The NPE is also referred as Synchronous Digital Hierarchy (SDH) interconnect equipment, SDH for short) interconnect equipment (SIE), and is an interlaced connection equipment of the SDH. The PFE is installed on a land login station for powering submarine equipment. The submarine lines include optical cables and electric cables. The SLM is used for monitoring the submarine line and the positioning fault points of the submarine line. The RPT is an underwater optical amplifier equipment, which is used for amplifying a transmission signal of the SLTE, while providing a loop of an optical signal for the monitoring equipment SLM. In this regard, the RPT is for amplifying and relaying the optical signal. Since an optical signal will be attenuated or weakened in a long-distance submarine line system, it is necessary to add a repeater in the system to amplify the optical signal.

Since the RPT, the BU, and the OEQ are all underwater equipment, therefore, the underwater equipment needs to resist or withstand a high submarine (i.e., hydrostatic) pressure. In addition, it is necessary that the RPT possesses excellent electrical insulation performance against a high internal voltage of about 20 KV, while the external portion of the RPT carries out communication under the seawater.

To solve the foregoing problems, typically, a middle part of the RPT is disposed with a cylindrical body having insulation characteristics. For example, a cylindrical body of submarine cable equipment having insulation pressure-resistant cylinder body is used for providing electrical insulation to the internal portion of the cable equipment from the seawater. The cylinder body also needs to withstand the high submarine pressure, and provide sufficient installation space or clearance for the interior optical and electrical devices. Likewise, the BU and the OEQ are both also disposed with the pressure-resistant cylinder body which electrically insulates the internal portion from the seawater, while withstanding the high submarine pressure and providing sufficient installation space or clearance for the devices.

The prior art insulation and pressure-resistant cylinder body of submarine cable equipment has a three-layer structure: an outermost layer pressure-resistant cylinder for resisting the high submarine pressure, a middle insulation layer for electrically insulating the internal portion from the seawater, and an innermost layer of installation cylinder for installing the inner optical and electrical devices.

In general, the insulation material is made of an epoxy resin with fiber glass, and is disposed between the pressure-resistant cylinder (i.e., outermost layer) and the installation cylinder (innermost layer). The insulation and pressure-resistant cylinder body of submarine cable equipment is formed by: first, casting the insulation material (i.e., epoxy resin with fiber glass) on an aluminum installation cylinder (i.e., over the innermost layer). The pressure-resistant cylinder (i.e., outermost layer) is then heated to expand its radius. The insulation cast over the (aluminum) installation cylinder is pressed altogether into the heated pressure-resistant cylinder, and then followed by a cooling process. The insulation layer with the installation cylinder (i.e., the resin with fiber glass over the aluminum installation cylinder) is therefore encapsulated within the pressure-resistant cylinder.

The above process, however, exhibits a problem that the insulation layer often only achieves low installation compactness, therefore could easily sways or deform.

SUMMARY OF THE INVENTION

Embodiments of the present application provide an insulation pressure-resistant cylinder body of submarine (undersea) cable equipment, submarine cable equipment, and a manufacturing method, which solves the problem that an insulation layer of cylinder body having low installation compactness and causing swaying or deformation in the prior art.

An embodiment of the present invention provides an insulation pressure-resistant cylinder body of submarine cable equipment, which includes an installation cylinder, an insulation layer, and a pressure-resistant cylinder that are disposed sequentially from inside to outside.

A first groove is opened on an outer surface of the installation cylinder, and a second groove is opened on an inner surface of the pressure-resistant cylinder, wherein the second groove is interlaced with the first groove.

The insulation layer is closely adhered to both the outer surface of the installation cylinder and the inner surface of the pressure-resistant cylinder.

An embodiment of the present invention further provides an RPT, which includes the insulation pressure-resistant cylinder body of the submarine cable equipment.

An embodiment of the present invention further provides a submarine line BU, which includes the insulation pressure-resistant cylinder body of the submarine cable equipment.

An embodiment of the present invention further provides a submarine line OEQ, which includes the insulation pressure-resistant cylinder body of the submarine cable equipment.

An embodiment of the present invention further provides a method for manufacturing the insulation pressure-resistant cylinder body of the submarine cable equipment, which includes:

forming a pressure-resistant cylinder and an installation cylinder through processing, where a first groove is opened on an outer surface of the installation cylinder, and a second groove is opened on an inner surface of the pressure-resistant cylinder, wherein the second groove is interlaced with the first groove;

using a mold to pour a resin potting compound directly into a cavity between the pressure-resistant cylinder and the installation cylinder to form an insulation layer; and forming an insulation pressure-resistant cylinder body through solidifying into the insulation layer, the resin potting compound between the pressure-resistant cylinder, and the installation cylinder.

According to the technical solutions of the embodiments, through the interlaced grooves on the outer surface of the installation cylinder and on the inner surface of the pressure-resistant cylinder, the insulation layer, the installation cylinder, and the pressure-resistant cylinder are closely and integrally combined, thereby improving stability of the cylinder body.

DETAILED DESCRIPTION OF THE EMBODIMENTS

To make the objectives, technical solutions, and advantages of the present invention clearer, the technical solutions of the embodiments of the present invention will be described clearly and comprehensively below with reference to the accompanying drawings of the embodiments of the present invention. It should be obvious that the embodiments to be described are only a part rather than all of the embodiments of the present invention. All other embodiments obtained by persons skilled in the art based on the embodiments of the present invention without creative effects shall fall within the protection scope of the present invention.

Figure 1:
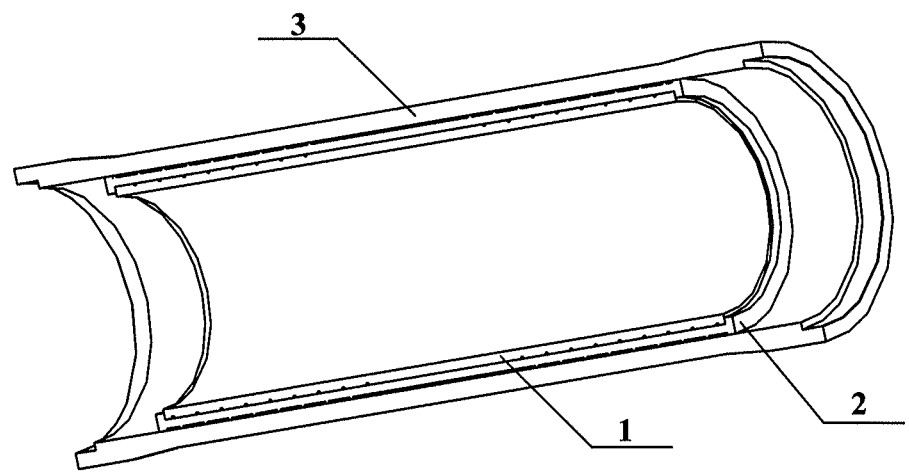
FIG. 1 is a schematic structure view of an insulation pressure-resistant cylinder body of submarine cable equipment according to an embodiment of the present invention.

As shown in FIG. 1, an insulation pressure-resistant cylinder body of submarine cable equipment includes an installation cylinder 1, an insulation layer 2, and a pressure-resistant cylinder 3 that are sequentially disposed from inside to outside. It should be noted that, in order to clearly illustrate an inner structure of the insulation pressure-resistant cylinder body in this embodiment, FIG. 1 merely illustrates a portion of the insulation pressure-resistant cylinder body.

The pressure-resistant cylinder 3 may be an outermost layer, which may be made of a high-strength corrosion-resistant metal. The insulation layer 2 may be a middle layer, which may be made of a resin potting compound. The installation cylinder 1 may be an innermost layer, which may be made of metals such as aluminum and copper, and is for installing inner devices.

A first groove is opened on an outer surface of the installation cylinder 1 (referring to FIG. 3A, FIG. 3B, FIG. 5A, and FIG. 5B), and a second groove is opened on an inner surface of the pressure-resistant cylinder 3 (referring to FIG. 2A, FIG. 2B, FIG. 4A, and FIG. 4B), wherein the second groove is interlaced with the first groove.

After the pressure-resistant cylinder 3 and the installation cylinder 1 are processed, a simple mold is used to pour the resin potting compound directly into a cavity between the pressure-resistant cylinder and the installation cylinder to form the insulation layer 2. After a period of time, the resin potting compound of the insulation layer 2 fixes the pressure-resistant cylinder and the installation cylinder, and the resin potting compound of the insulation layer 2, the pressure-resistant cylinder and the installation cylinder are integrally solidified. The insulation layer 2 is closely adhered to the outer surface of the installation cylinder 1 and the inner surface of the pressure-resistant cylinder 3.

A main material of the resin potting compound may be silica gel, and the resin potting compound may be formed through the mixing of the silica gel and other resins, and has desirable insulation performance.

In the foregoing embodiment, in the insulation pressure-resistant cylinder body of submarine cable equipment, through the interlaced grooves on the outer surface of the installation cylinder and on the inner surface of the pressure-resistant cylinder, the insulation layer, the installation cylinder, and the pressure-resistant cylinder are closely and integrally combined, thereby improving stability of the cylinder body. Further, the insulation layer uses the resin potting compound, such that the insulation layer may be directly cast between the installation cylinder and the pressure-resistant cylinder. The completed assembly of the cylinder may thus solve problems such as: requiring a large mold, using a complex process with high cost and requiring high precision in the casting process. Accordingly, the disclosed embodiment avoids the heating step of the pressure-resistant cylinder in the prior art assembly process, which is brought upon because of the step of casting the epoxy resin and the inner aluminum cylinder into the outermost cylinder body. The disclosed embodiment also simplifies the assembly technology of the cylinder body, which further reduces the cost of manufacturing.

Figure 2A:
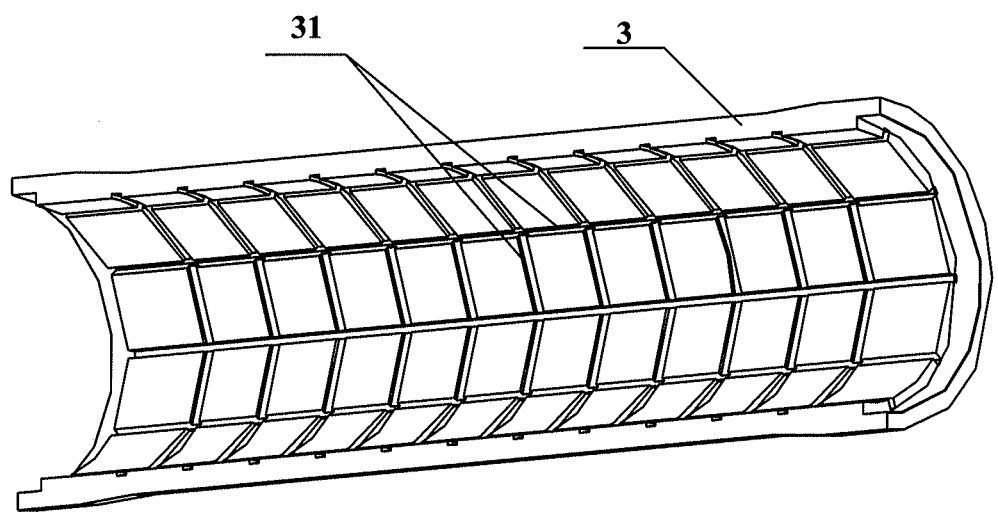
FIG. 2A and FIG. 2B are schematic structure views of a pressure-resistant cylinder in an insulation pressure-resistant cylinder body of submarine cable equipment according to an embodiment of the present invention.
Figure 2B:
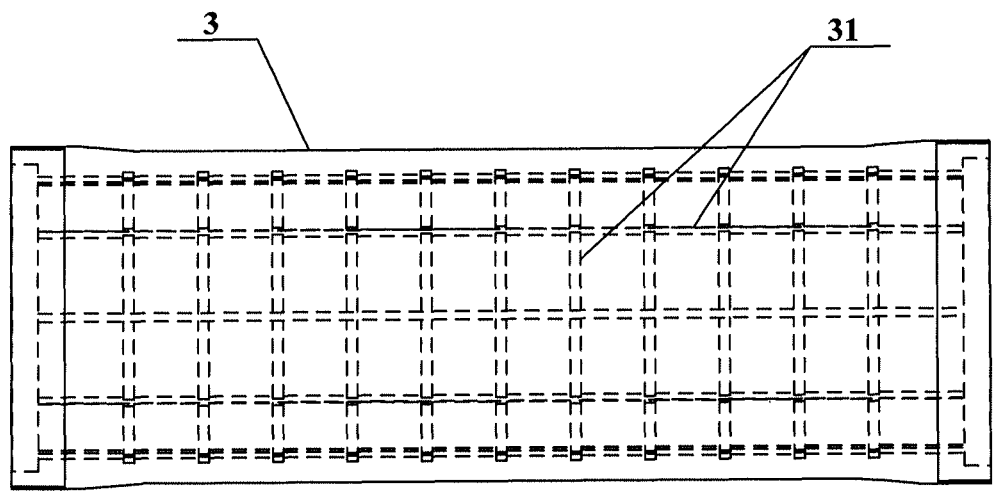

As shown in FIG. 2A and FIG. 2B, a longitude and latitude-shaped groove 31 may be opened on the inner surface of the pressure-resistant cylinder 3. FIG. 2A illustrates merely a portion of the pressure-resistant cylinder 3 in order to illustrate an inner structure of the pressure-resistant cylinder 3.

Figure 3A:
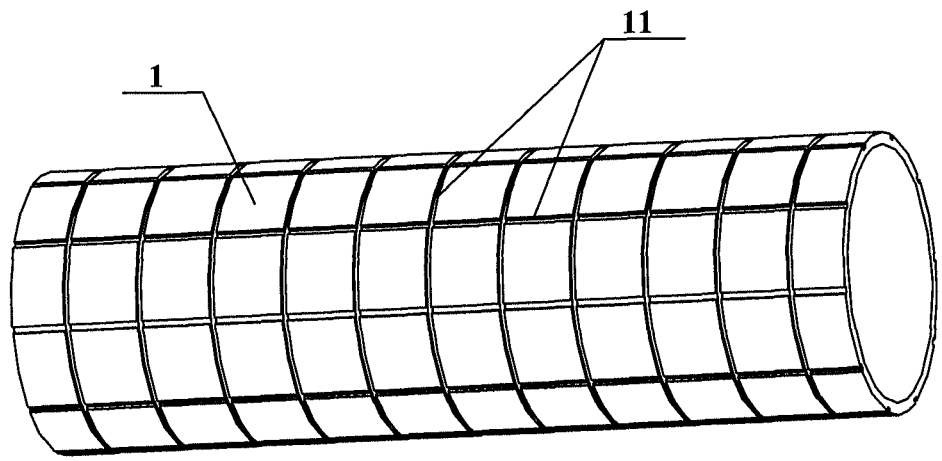
FIG. 3A and FIG. 3B are schematic structure views of an installation cylinder in an insulation pressure-resistant cylinder body of submarine cable equipment according to an embodiment of the present invention.
Figure 3B:
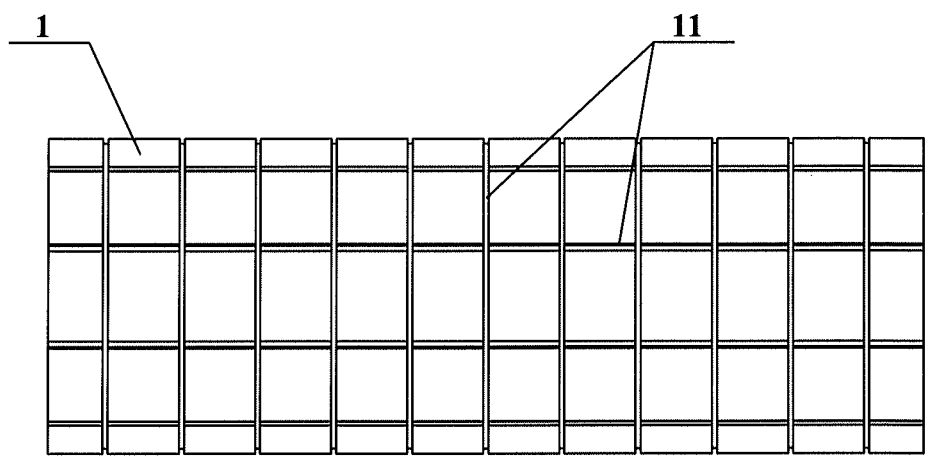

As shown in FIG. 3A and FIG. 3B, a longitude and latitude-shaped groove 11 are opened on the outer surface of the installation cylinder 1.

The longitude and latitude-shaped groove 11 and the longitude and latitude-shaped groove 31 are interlaced with each other, such that after the insulation layer 2 is cast and solidified between the installation cylinder 1 and the pressure-resistant cylinder 3, the resin potting compound cast in the groove is capable of bearing axial and radial forces and impacts. In addition, the solidified resin potting compound enables the installation cylinder 1, the insulation layer 2, and the pressure-resistant cylinder 3 to be closely integrated and combined. The integrated pressure-resistant cylinder 3 would be able to withstand an impact up to 100 G, where the insulation layer 2 and the installation cylinder 1 should neither shed off nor move against each other.

Figure 4A:
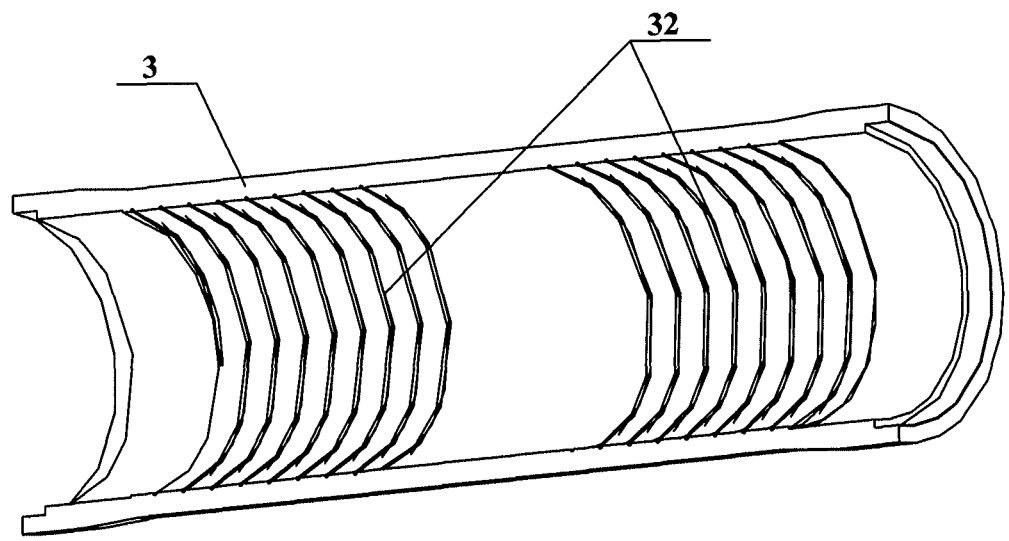
FIG. 4A and FIG. 4B are another schematic structure views of a pressure-resistant cylinder in an insulation pressure-resistant cylinder body of submarine cable equipment according to an embodiment of the present invention.
Figure 4B:
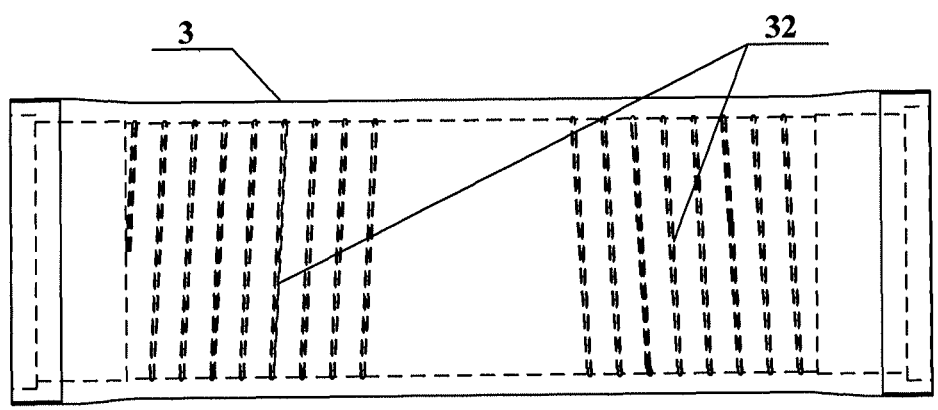

As shown in FIG. 4A and FIG. 4B, a spiral line-shaped groove 32 is opened on the inner surface of the pressure-resistant cylinder 3. In order to illustrate an inner structure of the pressure-resistant cylinder 3 in the insulation pressure-resistant cylinder body in this embodiment, FIG. 4A illustrates merely a portion of the pressure-resistant cylinder 3.

Figure 5A:
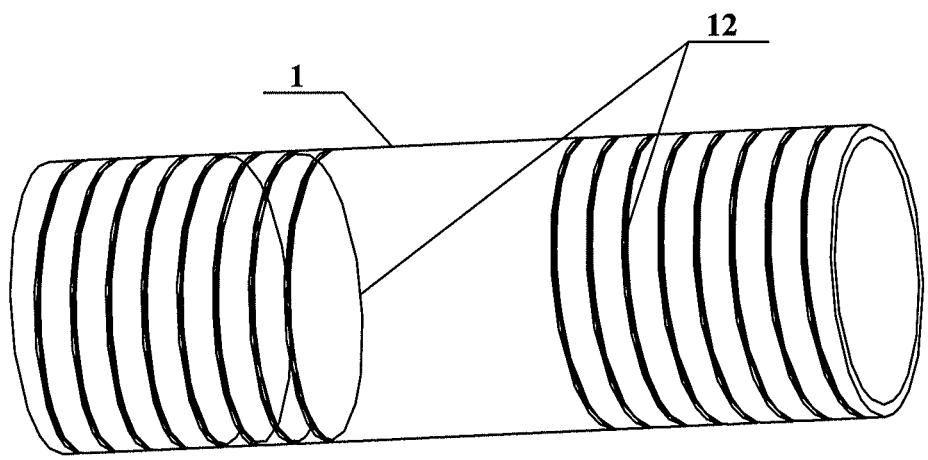
FIG. 5A and FIG. 5B are another schematic structure views of an installation cylinder in an insulation pressure-resistant cylinder body of submarine cable equipment according to an embodiment of the present invention.
Figure 5B:
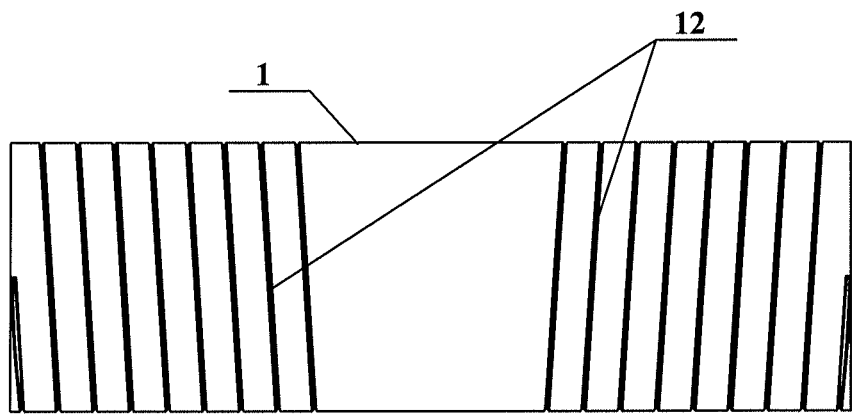

As shown in FIG. 5A and FIG. 5B, a first spiral line-shaped groove 12 is also opened on the outer surface of the installation cylinder 1.

A spiral direction of the second spiral line-shaped groove 32 is in opposite direction to the first spiral line-shaped groove 12.

After the pressure-resistant cylinder 3 and the installation cylinder 1 are processed, a simple mold is used to directly pour the resin potting compound into a cavity between the pressure-resistant cylinder and the installation cylinder to form the insulation layer 2. After a period of time, the resin potting compound of the insulation layer 2 fixes the pressure-resistant cylinder and the installation cylinder, and the resin potting compound of the insulation layer 2, the pressure-resistant cylinder and the installation cylinder are integrally solidified.

The first groove opened on the outer surface of the installation cylinder 1 and the second groove opened on the inner surface of the pressure-resistant cylinder 3 are not limited to the longitude and latitude-shaped groove and the spiral line-shaped groove, so long as the first groove is interlaced with the second groove. For example, the first groove may be a closed line-shaped around an axis of the installation cylinder, the second groove may be a closed line-shaped around the axis of the pressure-resistant cylinder, and the plane where the first groove is located may be interlaced with the plane where the second groove is located.

In this way, the cylinder body of the submarine repeater is easily assembled, no special device is needed, and mold opening are not required, thereby reducing the cost.

Figure 6:
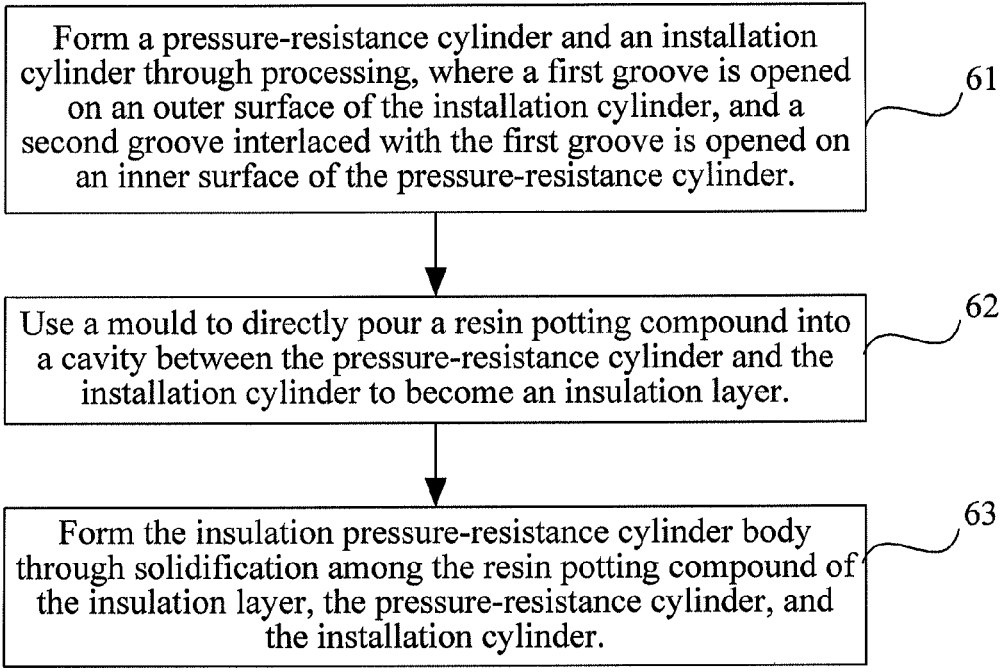
FIG. 6 is a flow chart of a method for manufacturing an insulation pressure-resistant cylinder body of submarine cable equipment according to an embodiment of the present invention.

FIG. 6 is a flow chart of a method of manufacturing an insulation pressure-resistant cylinder body of submarine cable equipment according to an embodiment of the present invention. As shown in FIG. 6, the method of manufacturing the insulation pressure-resistant cylinder body of the submarine cable equipment may include the following exemplary steps.

Step 61: Form a pressure-resistant cylinder and an installation cylinder through processing, where a first groove is opened on an outer surface of the installation cylinder, and a second groove is opened on an inner surface of the pressure-resistant cylinder, wherein the second groove is interlaced with the first groove.

Step 62: Use a mold to pour a resin potting compound directly into a cavity between the pressure-resistant cylinder and the installation cylinder to form an insulation layer.

Step 63: Form an insulation pressure-resistant cylinder body through solidifying into the insulation layer, the resin potting compound between the pressure-resistant cylinder and the installation cylinder.

Through step 61 to step 63, the insulation pressure-resistant cylinder body of the submarine cable equipment provided by the device embodiment may be obtained, and in the obtained insulation pressure-resistant cylinder body, the insulation layer, the installation cylinder, and the pressure-resistant cylinder may be closely integrated and combined, thus improving the stability of the cylinder body. In this embodiment, the resin potting compound is cast directly between the installation cylinder and the pressure-resistant cylinder to form the insulation layer. The assembly of the cylinder may be completed, thus solving problems such as: requiring a large mold, using a complex process with high cost, requiring high precision in the casting process, thus avoiding the heating step of the pressure-resistant cylinder during the prior art assembly process, which is brought upon because of the casting of epoxy resin. Accordingly, the disclosed embodiment simplifies the assembly technology of the cylinder body, which reduces the cost of the cylinder body. The submarine cable equipment such as the RPT, the BU, and the OEQ may include any one of cylinder bodies provided by the foregoing embodiment, resist the high submarine pressure and the seawater corrosion through the cylinder body, and achieve desirable insulation and sealing effects, thereby prolonging the service life of the submarine cable equipment and reducing the cost at the same time.

Figure 7:
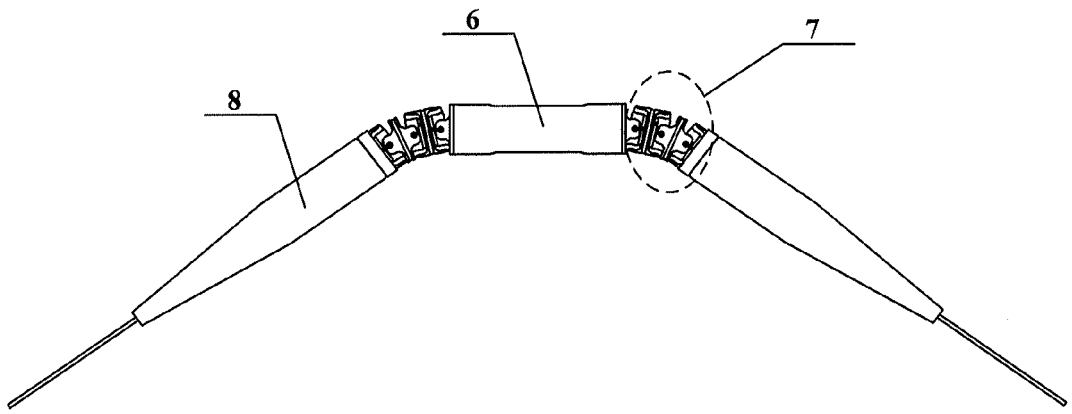
FIG. 7 is a schematic structural view of an RPT according to an embodiment of the present invention.

As shown in FIG. 7, the RPT includes a cylinder body 6, a universal joint 7, and a submarine line connector 8. The cylinder body 6 is in the middle, and two ends of the cylinder body 6 are respectively disposed with the sequentially connected universal joint 7 and the submarine line connector 8. The cylinder body 6 may be any one of the insulation pressure-resistant cylinder bodies of the submarine cable equipment with simple assembly, high installation precision and low cost, such that the entire cost of the RPT is reduced, and the service life is prolonged.

Finally, it should be noted that the above embodiments are merely examples describing exemplary technical solutions of the present invention, and should not be limited to the present disclosure. It should be understood by a person of ordinary skill in the art that the present described embodiments may be modified or alternately using equivalent replacements to achieve the same technical solutions without deviating from the spirit and scope of the present invention.

What is claimed is:

1. An insulation pressure-resistant cylinder body of submarine cable equipment, that comprises: sequentially disposed from inside to outside, an installation cylinder, an insulation layer, and a pressure-resistant cylinder, wherein:
    a first groove is opened on an outer surface of the installation cylinder, and a second groove is opened on an inner surface of the pressure-resistant cylinder, wherein the second groove interlaces with the first groove, wherein a plane where the first groove is located is configured be interlaced with a plane where the second groove is located; wherein
    the insulation layer is closely adhered to both the outer surface of the installation cylinder and the inner surface of the pressure-resistant cylinder.

2. The insulation pressure-resistant cylinder body according to claim 1, wherein the first groove and the second groove each comprises longitude and latitude-shaped grooves.

3. The insulation pressure-resistant cylinder body according to claim 1, wherein the first groove comprises a first spiral-line shaped groove, and the second groove comprises a second spiral-line shaped groove, wherein the second spiral-lined shaped groove is in opposite direction to the first spiral-lined shaped groove.

4. The insulation pressure-resistant cylinder body according to claim 1, wherein the insulation layer comprises a resin potting compound layer.

5. The insulation pressure-resistant cylinder body according to claim 2, wherein the insulation layer comprises a resin potting compound layer.

6. The insulation pressure-resistant cylinder body according to claim 3, wherein the insulation layer comprises a resin potting compound layer.

7. The insulation pressure-resistant cylinder body of submarine cable equipment according to claim 4, wherein a material of the resin potting compound layer comprises silica gel.

8. The insulation pressure-resistant cylinder body of submarine cable equipment according to claim 4, wherein the installation cylinder and the pressure-resistant cylinder are made of metal.

9. A submarine device, wherein the submarine device comprises an insulation pressure-resistant cylinder body having an installation cylinder, an insulation layer, and a pressure-resistant cylinder sequentially disposed from inside to outside, wherein:
   a first groove is opened on an outer surface of the installation cylinder, and a second groove is opened on an inner surface of the pressure-resistant cylinder, wherein the second groove interlaces with the first groove, wherein a plane where the first groove is located is configured to be interlaced with a plane where the second groove is located; and
   the insulation layer is closely adhered to both the outer surface of the installation cylinder and the inner surface of the pressure-resistant cylinder.

10. The submarine device according to claim 9, wherein the submarine device comprises a submarine repeater (RPT).

11. The submarine device according to claim 9, wherein the submarine device comprises a submarine line Branching Unit (BU).

12. The submarine device according to claim 9, wherein the submarine device comprises a submarine line Optical Equalizer (OEQ).

13. A method for manufacturing the insulation pressure-resistant cylinder body of submarine cable equipment, wherein the pressure-resistant cylinder body comprises an insulation pressure-resistant cylinder body having an installation cylinder, an insulation layer, and a pressure-resistant cylinder sequentially disposed from inside to outside, the method comprising:
   forming a pressure-resistant cylinder and an installation cylinder through processing, wherein a first groove is opened on an outer surface of the installation cylinder, and a second groove is opened on an inner surface of the pressure-resistant cylinder, wherein the second groove interlaces with the first groove;
   using a mold to pour a resin potting compound directly into a cavity between the pressure-resistant cylinder and the installation cylinder to form an insulation layer; and
   forming an insulation pressure-resistant cylinder body through solidifying into the insulation layer, the resin potting compound between the pressure-resistant cylinder and the installation cylinder.

\* \* \* \* \*

UNITED STATES PATENT AND TRADEMARK OFFICE
CERTIFICATE OF CORRECTION

PATENT NO. : 8,995,811 B2  Page 1 of 1
APPLICATION NO. : 13/542411
DATED : March 31, 2015
INVENTOR(S) : Qizhong Li et al.

It is certified that error appears in the above-identified patent and that said Letters Patent is hereby corrected as shown below:

On the Title Page

Left column, item (73), replace "Huawei Technologies Co., Ltd., Shenzhen (CN)" with --Huawei Marine Networks Co., Ltd., Tianjin (CN)--.

Signed and Sealed this
Second Day of February, 2016

Michelle K. Lee
*Director of the United States Patent and Trademark Office*